United States Patent [19]

Lander et al.

[11] Patent Number: 4,795,592

[45] Date of Patent: Jan. 3, 1989

[54] FILLED POLYMER COMPOSITIONS

[75] Inventors: Jacqueline R. Lander; John A. Griffiths, both of Alnwick, England

[73] Assignee: Carbon Research Limited, Newcastle-upon-Tyne, England

[21] Appl. No.: 63,212

[22] Filed: Jun. 17, 1987

[30] Foreign Application Priority Data

Jun. 18, 1986 [GB] United Kingdom ................ 8614784

[51] Int. Cl.$^4$ ............................................. H01B 1/06
[52] U.S. Cl. ................................... 252/511; 252/502; 428/411.1; 428/511; 428/500; 524/495; 524/496; 523/440; 523/468
[58] Field of Search ................ 252/502, 511; 524/495, 524/496, 911; 523/440, 468; 428/411.1, 447, 511, 449, 537.5, 500, 924

[56] References Cited

U.S. PATENT DOCUMENTS 4,369,171 1/1983 Grindstaff et al. .................. 252/502
4,534,886 8/1985 Kraus et al. ......................... 252/502

FOREIGN PATENT DOCUMENTS 3424130 1/1986 Fed. Rep. of Germany .

OTHER PUBLICATIONS

EPO Search Report dated Jun. 4, 1988.

Primary Examiner—Josephine Barr
Attorney, Agent, or Firm—Cushman, Darby & Cushman

[57] ABSTRACT

A polymer composition has a filler of particulate conductive material including at least 0.5% by weight of char carbon produced by carbonization of plant material, particularly herbaceous straw. The filler may also contain other conductive materials such as carbon black. Compositions with electrical resistivities over a wide range may be produced, preferably with polymers adapted for use as coatings. In particular compositions with surface resistivities between $10^6$ and $10^9$ ohms per square are available and find use as antistatic coatings, avoiding the excessively rapid discharge of static electricity that occurs with fillers of carbon black alone.

8 Claims, No Drawings

FILLED POLYMER COMPOSITIONS

FIELD OF THE INVENTION

This invention relates to electrically resistive filled polymer compositions, particularly to those suitable for providing an "antistatic" coating.

BACKGROUND OF THE INVENTION

At present there are many technical and industrial situations in which it is necessary to avoid or minimize the effects of static electricity. Normally this is itself innocuous, but the effects of its discharge can be both catastrophic and expensive. As a fairly obvious example, fires and explosions may be caused by sparking discharge of static electricity in industrial plants. However at present there is a great requirement for antistatic materials in the electronics industry, where each year many millions of pounds worth of sophisticated components are either destroyed or so wounded as to impair their performance, reliability or life time, by the discharge of static electricity through sensitive parts thereof. Although the static charges that accumulate at e.g. the surfaces of the insulating boxes in which such components are carried around are usually small, they may have a very high potential and can therefore cause damagingly high currents to flow, albeit for very short periods.

At present there are two primary known regimes for avoiding the effects of this static discharge at surfaces. The first involves the prevention of static build-up, and uses conductive materials, i.e. materials with surface resistivities of less than about $10^5$ ohms per square. There is however no guarantee that e.g. an electronics device can be completely shielded from static build up during manufacture, shipping etc. and in this regime the discharge of any such build-up is liable to be damagingly rapid.

A second regime is termed "antistatic" and is intended to allow discharge of any static build-up. At present this is generally achieved by the use of manufacturing aids moulded from polymers loaded with a conducting filler, usually a finely divided carbon black. With these loaded polymers surface resistivities up to about $10^6$ ohms per square may be achieved. Unfortunately for many applications such an antistatic material still has insufficient resistivity to prevent potentially damaging rates of electrostatic discharge, but it has in practice not been possible to provide a loaded polymer with the desired greater resistivity. The reason for this is as follows. The role of the filler in a conducting or antistatic loaded polymer is to provide electrically conducting pathways through the insulative polymer base. Conduction through the material occurs by electron tunnelling from one conductive particle to another, and the degree of tunnelling that can occur depends on the mean free paths between these particles. Above a certain critical distance, no tunnelling can take place. In order to obtain a loaded polymer of the highest possible resistivity, it is of course necessary to reduce the proportion of conducting filler as far as possible. However, assuming that the filler particles are all the same shape and homogeneously mixed, a concentration will be reached at which all the particles are at the critical distance apart. Any further reduction in the amount of filler below this critical concentration will result in no conduction by tunnelling and the composition will suddenly become an insulator; the desired intermediate resistivity cannot be achieved. In an attempt to achieve these resistivities, conductive filler particles of very high aspect ratio have been used such as e.g. chopped carbon fibers and high conductivity long chain carbon blacks. These are normally very expensive and in any case difficult to use as loading materials because they tend to be non-wettable and have a strong tendency to aggregate. Even using these filler materials it has not been found possible to produce adequately resistive compositions; because of the critical concentration problem discussed above they are either substantially insulating or excessively conductive. A further problem with carbon black loaded polymers is a tendency to change in resistivity when subjected to strain, especially when vulnerable high aspect ratio carbon chains are involved.

It has also been sought to avoid the problem of electrostatic build up by using static dispersive coatings, which render the surface of a material hydroscopic and derive their ability to disperse static charge from the adsorption of ambient moisture. If anything these tend to be rather strongly insulating, with surface resistivities greater than $10^8$ ohms per square. Moreover they are easily damaged, short lived and, relying as they do on ambient humidity, are variable in their effectiveness.

Clearly it would be desirable to provide a resistive composition which can include the resistivity range between $10^6$ and $10^8$ ohms per square, while also being cheap and convenient to manufacture. It would be particularly desirable to be able to formulate with this convenience a composition with a chosen surface resistivity anywhere in the large range of, say, $10^2$ to $10^{11}$ ohms per square.

SUMMARY OF THE INVENTION

Seeking to make it possible to overcome at least some of the above-mentioned limitations of the prior art, the invention provides a composition, comprising a particulate filler of electrically conductive material dispersed in an insulating polymeric base, in which at least 0.5% by weight of the filler is char carbon made by carbonizing non-woody plant material. The relative proportions of the filler:base and char:filler are such that at least 0.05% by weight of the composition as a whole is char carbon.

Preferably the filler constitutes between 0.1% and 50% by weight of the composition (or, is in weight proportion between 1:1000 and 1:1 relative to the polymeric base), more preferably between 1% and 30% (or, 1:99 and 30:70).

The char carbons used in the invention are made by carbonizing non-woody or herbaceous plant material, preferably as is presently commonly used to provide fibrous tissue for paper or textile manufacture. The definition does not include char made from woody tree materials as are generally used to make charcoal, nor does it include chars which have been given special oxidation treatments to produce activated charcoals, or carbon materials not prepared directly from plants, e.g. from coal. Preferably the char carbon is prepared by heating plant material in one or more stages to carbonize it and then subdividing it by e.g. grinding in a mill, preferably to an average particle size less than 100 $\mu$m and still more preferably less than 75 $\mu$m. The preferred carbon content of the char carbon is between 85 and 95%.

In the invention, the particulate char carbon is used as a conductive filler material forming at least 0.05% by weight of a composition with the insulating polymeric base. The char carbon may itself be the only conducting filler material used. More commonly, however, it may be used in combination with a more conductive particulate carbon filler material, not being a char carbon as defined herein. For example, the char carbon material can be combined with one or more particulate materials selected from carbon black, graphite, chopped carbon fibers or carbon wool. The char carbon may then constitute as little as 0.5% by weight of the conductive filler material; the amount used will depend on the resistivity properties desired for the combination and on the percentage of filler to be used. Typically char carbon might constitute between 5% and 80% of the filler by weight, commonly between 20% and 50%.

By varying the proportions of constituents, compositions may be obtained with various surface resistivities across the range from $10^2$ to $10^{11}$ ohms per square, and because the char carbons may be made from cheap raw materials by a simple process (in comparison with e.g. the extremely expensive high aspect ratio carbon blacks used at present) greater manufacturing economy may be achieved. However a particular advantage lies in the possibility of having compositions whose surface resistivities lie substantially over about $10^5$ ohms per square, and particularly those between $10^6$ and $10^9$ ohms per square, which previously have not been practically obtainable. As mentioned above, compositions of such resistivities are particularly appropriate for antistatic uses. It is presently believed that the intrinsically fibrous structure (high aspect ratio) of the plant material, in combination with its tendency to somewhat discontinuous internal structure and hence high resistivity even when carbonized, contribute to this very desirable property of the char carbon-containing composition. In a filler in combination with carbon black, for example, the char carbon particles seem to function as high-resistivity "blocks" connected to one another through the polymer base by the more conductive blacks.

A particularly preferred application for the compositions of the invention is in providing coatings on articles, such as for example those articles mentioned above as being used in the electronics industry. In a preferred aspect, therefore, the polymeric base used is a coating material, and the invention in another aspect provides an article coated with a composition as described above in accordance with the invention. The coating may be applied to the article by any appropriate means, which may be conventional, as indeed may be the coating polymer itself.

The compositions according to the invention may also if desired include other, essentially non-conductive, fillers for e.g. bulking out or colouring the composition. These however are not to be taken into account when reckoning the proportions of char carbon to total filler discussed above.

DETAILED DESCRIPTION OF PREFERRED EMBODIMENTS

A. Preparation of Char Carbon

One presently preferred raw material for the char carbon is straw, and in particular straw (broadly defined to include both stems, leaves and seed coat) of the following herbaceous species has been found suitable:

| | |
|---|---|
| Flax | (*Linium usitatissium*) |
| Ramie | (*Boehmeria nivea*) |
| Hemp | (*Cannabis sativa*) |
| Cotton | (*Gossypium*) |
| Sisal | (*Agave sisalana*) |
| Manila Hemp | (*Musa textilis*) |
| Jute | (*Corchorus*) |
| Oat | (*Avena*) |
| Barley | (*Hordeum*) |
| Rye | (*Secale*) |
| Wheat | (*Triticum*). |

In one specific example, bales of barley straw were used, in the condition in which it had been taken from the fields where it had been standing. In a first stage, the straw was placed in a tank, of a type similar to that used for preparing barbecue charcoal from wood, and set on fire. A large fraction of the straw was thus simply burned, producing heat which served to carbonize the remaining straw. In a second stage, the partially carbonized straw from the first stage was removed from the tank and placed in a kiln set up so as to exclude atmospheric oxygen. The temperature in the kiln was then raised over a period of about six hours to approximately 1100° C. This temperature having been reached, the kiln was allowed to cool gradually, which took about 30 hours. By means of this heating step, the carbon content of the char was raised to about 90%. Then in a third stage the product was ground in a mill sufficiently to pass through a 75 μm sieve, whereupon it was ready for use.

The degree of carbonization obtained by the above process was found to vary naturally from plant species to plant species, and consequently process conditions require to be varied accordingly to obtain a given degree of carbonization. Moreover the grinding action required to reduce the char to a suitable size before sieving can be used to vary the aspect ratio of the char. For example a particular formulation containing char ground in a ball-mill and sieved through a 75 μm sieve gives a surface resistivity (of a coated test piece) of $10^5$ ohms per square. However when instead the char was ground in a pin-mill and sieved through a 75 μm sieve, the resistivity of the test piece was down to $10^3$ ohms per square. The difference in resistivities is attributable to a difference in the aspect ratios of the ground particles, those of the particles from the pin-mill being about five times greater than those from the ball-mill. The residence time of the char in the mill may be used to control the final particle size fractions of the ground char. For most species adequate carbonization may in fact be obtained by heating to temperatures as low as 700° C., but reproducibility of properties is less good with chars produced at these low temperatures.

B. Preparation of Compositions

In the basic procedure used here for preparing compositions embodying the invention, the constituents are all added together at once and then mixed so as to impart a substantial degree of shear to the composition. This shear is necessary because, as is known from making carbon black loaded polymers, the high aspect ratio carbon particles involved have very poor wettability in most polymers and tend to be difficult to disperse. The choice of polymeric base itself is of course dependent on the application envisaged for the particular composition; likewise the proportions of char carbon and other fillers will depend on the resistivity desired. Polymers already known as suitable for loading with carbon black will generally also be suitable for the present invention. The invention is moreover particularly advantageously used with coating polymers which again may be of known type. For coating purposes it is unlikely that the weight percentage of filler will be more than 40%, since otherwise difficulties are likely to be encountered in applying the coating.

EXAMPLE B1

The following ingredients were mixed in the proportions indicated by stirring at room temperature in a mixer incorporating a paddle rotating in a tube along which the composition is passed, to shear it.

| | Parts by weight |
|---|---|
| Talc | 140 |
| Calcium carbonate | 140 |
| Ethyl hydroxy ethyl cellulose | 140 |
| Potassium polymethacrylate diluted 1:6 in water | 20 |
| Sodium polyphosphate glass 5% aqueous solution | 20 |
| Potassium hydroxide 50% aqueous solution | 2 |
| Water | 150 |
| Antifoaming agent (Foamaster NX2) | 1 |
| Fungicide (Acticide BG) | 1 |
| 2-(2,butoxyethoxy)ethylacetate | 20 |
| Vinyl acetate/Vinyl chloride/ethylene copolymer | 244 |
| Conductive Carbon Black (Degussa Corax L) (Standard colour furnace black; particle size about 20 nm; structure - dibutyl phthalate adsorption index of 200 ml/100 g DBP) | 93 |
| Char carbon from Example A | 29 |
| | 1,000 |

It will be seen that this example includes a substantial proportion of non-conductive filler material to improve the mechanical proporties of the composition, as well as preservatives to prevent fungal growth. Depending on the exact nature of the char used, such a composition had a surface resistivity between $10^6$ and $10^7$ ohms per square. It has very wide applicability as an antistatic coating, particularly for a large variety of packing materials, and was coated onto polystyrene sheet, moulded forms and many types of paper and cardboard wrappers and containers.

EXAMPLES B2

The following ingredients were mixed as in Example B1:

| | Parts by weight |
|---|---|
| Methylsilicone resin (Wacker HK46) in 50% xylene solution | 920 |
| High conductivity carbon black (Ketjen EC) (very high structure; particle size about 25 nm) | 60 |
| Char Carbon as in Example A | 20 |
| | 1,000 |

Here a special hydrophobic resin has been used, which renders waterproof materials coated with it. Because of its hydrophobic qualities sucha composition might find use, for example, in coating articles used in the food industry. Its surface resistivity is about $10^6$ ohms per square.

EXAMPLE B3

The following ingredients were mixed as in Example B1;

| | Parts by weight |
|---|---|
| Water dispersible epoxy resin (Araldite PY340) | 119 |
| Char carbon as in Example A | 9 |
| High Conductivity carbon black (Ketjen EC) | 5 |
| Conductive carbon black (Degussa Corax L) | 9 |
| Polyaminoamide aqueous hardener (available from Ciba-Geigy) | 50 |
| | 192 |

This composition was rather more conductive than the previous two examples, with a surface resistivity between $10^4$ and $10^5$ ohms per square. Such an epoxy composition (usually with the addition of some additional non-conductive filler to bulk it out) is suitable for e.g. flooring in anaesthetic rooms, wherein it is known that electrostatic build up and sudden discharge should be avoided if at all possible.

EXAMPLE B4

The following ingredients were mixed for 10 minutes as above:

| | Parts by weight |
|---|---|
| Medium hard ethyl phenyl silicone resin | 970 |
| Conductive carbon black | 6 |
| Char carbon as in Example A | 24 |
| | 1,000 |

The composition produced was applied to a flat insulating body as a surface coating and air dried for 24 hours. It was found to have a surface resistivity of $3 \times 10^7$ ohms per square.

We claim:

1. An electrically resistive filled polymer composition comprising:
   (a) an insulating polymeric base, and
   (b) a particulate filler dispersed in said base the proportion of the filler to the base being between 1:1000 and 1:1 by weight, the filler being of material capable of conducting electricity and comprising between 0.5% and 100% by weight of char carbon, said char carbon being carbonised non-woody plant material of average particle size less than 100 μm and constituting at least 0.05% by weight of the total composition.

2. A composition as defined in claim 1 wherein said conductive filler comprises, in addition to said char carbon, up to 95.5% by weight of at least one other conductive carbon material selected from the group consisting of carbon black, graphite, chopped carbon fibre and carbon wool.

3. A composition as defined in claim 2 wherein said conductive filler consists essentially of said char carbon and carbon black.

4. A composition as defined in claim 1 wherein said char carbon constitutes at least 5% by weight of said conductive filler.

5. An article provided with an antistatic coating of a composition as defined in claim 1.

6. In an electrically resistive filled polymer composition comprising (a) an insulating polymeric base and (b) a particulate filler, dispersed in said base, of material capable of conducting electricity and including carbon black, the improvement comprising particulate char carbon, said char carbon being carbonized herbaceous plant material of average particle size less than 100 μm and constituting between 5% and 80% by weight of said conductive filler.

7. The improvement as defined in claim 6 wherein said char carbon has a carbon content between 85% and 95% by weight.

8. A method of making an electrically resistive filled polymer composition, comprising the steps of:
   (a) heating herbaceous plant material to form a char carbon;
   (b) subdividing said char carbon to form a particulate material of average particle size less than 100 $\mu$m, and
   (c) dispersing a conductive particulate filler material, comprising at least 0.5% by weight of said particulate char carbon, in an insulating polymeric base to form the composition, the proportion of the filler to the base being between 1:1000 and 1:1 by weight.

* * * * *